United States Patent [19]

Nercessian

[11] 4,193,104

[45] Mar. 11, 1980

[54] PROGRAMMABLE OVERVOLTAGE PROTECTOR

[75] Inventor: Sarkis Nercessian, Flushing, N.Y.

[73] Assignee: Kepco, Inc., Flushing, N.Y.

[21] Appl. No.: 865,183

[22] Filed: Dec. 28, 1977

[51] Int. Cl.² ............................................. H02H 3/20
[52] U.S. Cl. ........................................ 361/56; 361/55;
361/91; 361/110
[58] Field of Search ........................ 361/56, 91, 18, 54,
361/55, 88, 89, 110, 111; 323/8; 307/237

[56] References Cited

U.S. PATENT DOCUMENTS

| | | |
|---|---|---|
| 3,449,634 | 6/1969 | Han-Min-Hung ...................... 361/56 |
| 3,594,612 | 7/1971 | Gately ................................ 361/91 X |
| 3,790,809 | 2/1974 | Kuster ................................ 361/56 X |
| 3,816,809 | 6/1974 | Kuster ................................ 361/18 X |
| 3,949,271 | 4/1976 | Nercessian ............................ 361/56 |

Primary Examiner—Patrick R. Salce
Attorney, Agent, or Firm—Alfred W. Barber

[57] ABSTRACT

Increased versatility in crowbar overvoltage protection for regulated power supplies is provided by a tracking circuit which allows setting the overvoltage limit at a predetermined increment above a programmable output voltage. In addition provision is made for programming up the crowbar protection circuit rapidly to anticipate the rise of voltage in the main power supply and for delaying the programming down of the protection circuit to allow the main power supply voltage to decay without triggering the protection circuit.

11 Claims, 1 Drawing Figure

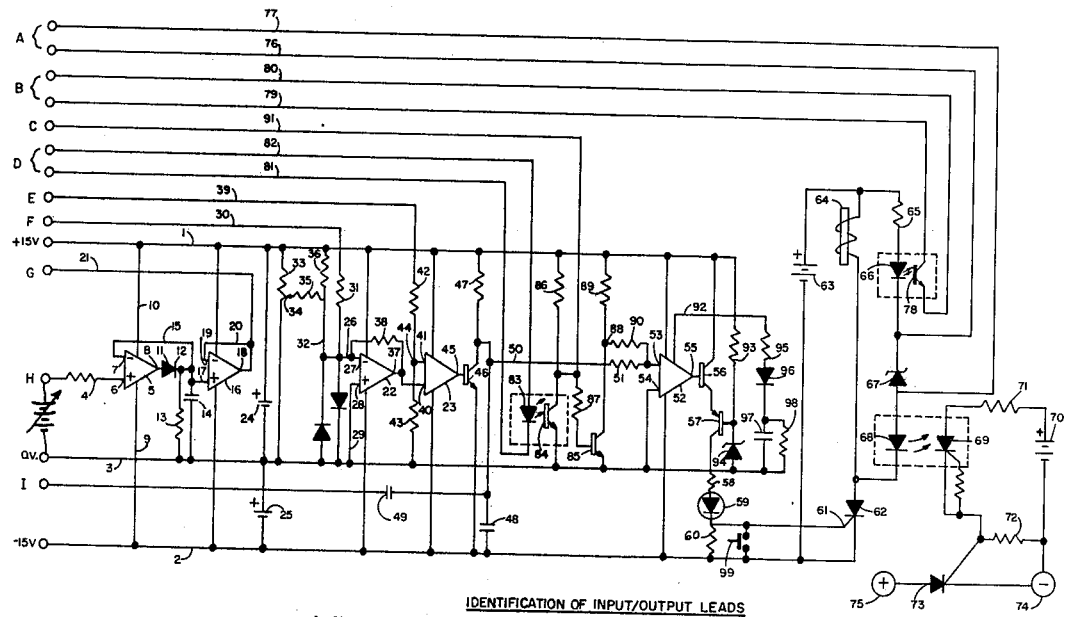

IDENTIFICATION OF INPUT/OUTPUT LEADS
A= CROWBAR OUTPUT (NON-ISOLATED)   F= OVERVOLTAGE INPUT EXTERNAL
B= CROWBAR OUTPUT (ISOLATED)   G= OVERVOLTAGE TRACKING OUTPUT
C= TTL CROWBAR INPUT (NON-ISOLATED)   H= OVERVOLTAGE TRACKING INPUT
D= CROWBAR INPUT (ISOLATED)   I = CROWBAR DELAY
E= OUTPUT VOLTAGE FEEDBACK

U.S. Patent  Mar. 11, 1980  4,193,104

IDENTIFICATION OF INPUT/OUTPUT LEADS

A = CROWBAR OUTPUT (NON-ISOLATED)  F = OVERVOLTAGE INPUT EXTERNAL
B = CROWBAR OUTPUT (ISOLATED)  G = OVERVOLTAGE TRACKING OUTPUT
C = TTL CROWBAR INPUT (NON-ISOLATED)  H = OVERVOLTAGE TRACKING INPUT
D = CROWBAR INPUT (ISOLATED)  I = CROWBAR DELAY
E = OUTPUT VOLTAGE FEEDBACK

PROGRAMMABLE OVERVOLTAGE PROTECTOR

PRIOR ART

Regulated power supplies are often employed to power voltage sensitive devices and circuits. Such circuits may be damaged by voltages rising above some preset level. Over-voltage may arise for various reasons and must be guarded against. One method of protecting a load against over-voltage is to provide a crowbar in the form of a silicon controlled rectifier (SCR) connected across the load to be protected and triggered in response to an over-voltage thereby shorting the output of the regulated power supply. Such protective circuits are shown and described in U.S. Pat. Nos. 3,449,634 and 3,594,612.

This prior art mode of operation works well when a predetermined fixed output voltage is used from the power supply. For example, if one is using a regulated 15 volts to power a voltage sensitive device to be protected, the crow-bar sensing circuit can be set at, say 17 volts, providing a 2 volt over-voltage guardband. However, if the power supply is set at some other output voltage, say 20 volts, the fixed 17 volt crow-bar point becomes quite inappropriate. Thus, the crow-bar trip point must be reset for each new output voltage. Such a procedure is time consuming and becomes a real problem in automatic test systems where a series of different voltages may be programmed in rapid succession.

There are other problems which have not been solved by prior art systems. One is that when a power supply is turned off, the crow-bar may be triggered due to a lag in the output voltage whereby the crow-bar circuit sees an over-voltage merely because it shuts down faster than the main power supply.

Another problem may arise on fast load change in a fast slewing power supply. This may produce output voltage transients which may create a false triggering of the crow-bar.

THE PRESENT INVENTION

The present invention provides a number of significant improvements over power supplies of the prior art. Power Supply crow-bar provision is made to shut down the power supply in response to an over-voltage condition. A crow-bar is usually provided in the form of a silicon controlled rectifier connected across the load terminals. In the presence of an over-voltage across the load terminals, this SCR is fired shorting the output. Other actions may also be instituted, such as, opening the input power lines and providing an indication that the crow-bar has been actuated.

The crow-bar control circuitry is generally operated from an auxiliary source of power. This means that on turn-on and turn-off of the whole system the main power supply and this auxiliary power supply may not build up and decay at the same rate. This suitation often results in an apparent over-voltage condition causing the crow-bar to fire when, in fact, such an event is undesirable.

In accordance with the present invention, on turn-on of the power supply the crow-bar circuit is delayed to prevent false triggering. On turn-off the crow-bar circuit is deactivated to prevent false triggering due to unequal decay times of the main and auxiliary power supplies. In addition means are provided for increasing the crow-bar delay to accommodate very fast transients due to fast load changes in capacitorless power supplies which otherwise will create undesirable crow-bar triggering.

An important feature of the present invention is the automatic tracking provision which permits programming the output of the main power supply without resetting the crow-bar trigger level hitherto necessary. The automatic tracking circuit provides a crow-bar trip level which automatically follows the output of the main power supply plus a predetermined increment.

Another provision in accordance with the present invention is a disarming circuit which holds off the crow-bar to permit testing its control circuit without actually triggering the SCR. An indicator shows when the crow-bar trigger point has been reached. This permits setting up the crow-bar circuit and checking its operation without actually shorting the power supply.

The FIGURE of the drawing is a schematic circuit diagram, partly in block form, of the preferred embodiment of the present invention.

The drawing figure shows the essential circuit, partly in block form, for carrying out the preferred form of the present invention. An auxiliary power source represented by batteries 24 and 25 supplies bias of plus 15 volts over line 1 and minus 15 volts over line 2 with reference to 0 or common line 3. The crowbar programming voltage is applied through isolation resistor 4 to the non-inverting input 6 of operational amplifier 5. Operational amplifier 5 receives bias from negative line 2 over lead 9 and from positive line 1 over lead 10. Output 8 is fed to the anode 11 of diode 11-12 and cathode 12 is connected to capacitor 14 shunted by resistor 13 and both are returned to common line 3. The cathode end of diode 11-12 is connected over lead 15 to the inverting input 7 of amplifier 5 completing a 100 percent degenerative circuit so that amplifier 5 functions as a high input impedance voltage follower. The circuit as described so far operates as a over-voltage programming delay circuit since, in effect, the crowbar programming voltage charges capacitor 14 up fast through diode 11-12 from the output of amplifier 5 and discharges slowly with a time constant determined by the product of the capacity of capacitor 14 and the resistance of resistor 13. In order not to load capacitor 14, a second follower operational amplifier 16 is provided with its non-inverting input 17 connected to the high side of capacitor 14. Completing the follower circuit of amplifier 16 is lead 20 connected between output 18 and inverting input 19. The delayed signal thus provided is connected over lead 21 for further use as crowbar reference voltage as will be set forth below. This delayed reference voltage may be used to prevent the operation of the crowbar on programming down of the power supply particularly in an unloaded slow speed supply which may reach a lower output voltage more slowly than the crowbar level in over-voltage tracking mode of operation.

The following two operational amplifiers 22 and 23 are provided to provide an off-set and as a comparator respectively. Two voltages are combined on lead 26 connected to inverting input 27 of amplifier 22. Non-inverting input 28 is connected over lead 29 to common line 3. One voltage is supplied over lead 30 and through resistor 31 to input 27. This, for example, may be from an external source of over voltage reference of from previously described delay reference. A second voltage is applied over lead 32. This is an over-voltage to provide a margin for the crowbar operation. This overvoltage is provided by voltage derived from potentiometer 33 bridged between positive line 1 and common line 3. A variable voltage is taken at variable contact 34 through resistor 35 to lead 32. Further voltage is supplied to lead 32 through resistor 36. This latter provides a residual margin even when variable contact 34 is set to zero. All these voltages combine to provide an increment of over-voltage to input 27 so that crow-bar action is off-set to provide a margin permitting a predetermined over-voltage above the applied reference before the crowbar will be activated. Amplifier 22 is connected to have a predetermined gain determined by feedback resistor 38 connected between output 37 and inverting input 27. This is provided so that the output at 37 will match the output of a given power supply. For example, the external reference applied to lead 30 may be 0.5 volts while the output of the power supply being monitored may be 0-40 volts.

Amplifier 23 is connected as a comparator for comparing the amplified reference carrying an off-set from amplifier 22 with the output of the power supply being protected applied over lead 39. The amplified and off-set reference voltage is applied to input 40. This output voltage from the power supply being protected over lead 39 is divided by reisistors 42 and 43 and their junction point 44 is applied to input 41.

The inputs to comparator 23 are so chosen that as long as the reference voltage on input 40 is greater than the output voltage on input 41 the output 45 will be positive and transistor 46 will be normally conducting. Should the output voltage on input 41 exceed the reference, output 45 goes negative turning off transistor 46. With transistor 46 out of conduction current flows through resistor 47 charging capacitor 48 and raising the potential on lead 50. Thus, resistor 47 and capacitor 48 form a delay circuit delaying the rise of voltage on lead 50. This delay may be increased by completing the circuit to place capacitor 49 in parallel with capacitor 48.

The rising voltage on lead 50 is applied through resistor 51 to input 53 of comparator 52. Input 54 is connected to common line 3. When rising input voltage at 53 exceeds 0 volts output transistor 56 triggers on. Thus current passes through normally conducting transistor 57, resistor 58, diode 59 and resistor 60 thereby establishing a positive voltage drop across resistor 60. This positive voltage drop is applied to gate 61 of silicon controlled rectifier 62 causing it to trigger. With SCR 62 in conduction, current flows from a voltage source represented by battery 63 through circuit breaker coil 64. Circuit breaker 64 may open the input power lines, for example. The drop across coil 64 causes a current to flow through resistor 65, light emitting diode 66, zener diode 67 and light emitting diode 68. When LED 68 is thus turned on, light sensitive SCR 69 is turned on and current flows from a suitable voltage source shown as battery 70 through resistors 71 and 72. The drop across resistor 72 is connected between cathode and gate of SCR 73 turning it on. SCR 73 is the main crowbar SCR and is connected across the power supply output terminals 74 and 75 thus crowbarring the output of the power supply.

The voltage drop across zener diode 67 is conducted over leads 76 and 77 to form a non-isolated crowbar output. The collector and emitter of light sensitive transistor 78 coupled to LED 66 are connected over leads 79 and 80 to form an isolated crowbar output.

This crowbar circuit may be activated from an external source over an isolated circuit including LED 83 connected to leads 81 and 82. A crowbar command over these leads lights LED 83 turning on light sensitive transistor 84. When transistor 84 is thus made conducting, transistor 85 which receives its bias across transistor 84 and through resistor 87 is turned off. With transistor 85 off the voltage at the junction 88 between resistors 89 and 90 rises placing a positive potential on input 53 through resistor 90. This, in turn, turns on the crowbar in the manner described above. A non-isolated circuit is also provided over lead 91 which when shorted to lead 3 turns off transistor 85 resulting again in crowbar action as described above.

The crowbar circuit is automatically disarmed when the voltage on positive line 1 falls below a predetermined level. This is desirable since if the auxiliary power supplying the crowbar control circuitry falls faster than the main power supply output it is important not to let the crowbar fire falsely. Transistor 57 is normally conducting due to current through resistor 93 and the voltage drop across zener 94. Should the voltage across zener 94 drop below its zener voltage, it will no longer draw current to hold down the voltage on the base of transistor 57 and it will go out of conduction. With transistor 57 out of conduction current cannot flow through the crowbar control circuits and the crowbar will be disabled.

A further provision is made to prevent false crowbar action on turning on the main power supply. Comparator 52 has a strobe input connected to lead 92. Comparator 52 is designed not to function as long as its strobe input is low. When the auxiliary power is first turned on, strobe line 92 is low due to the fact that no charge is held on capacitor 97 and line 92 is held low through resistor 95 and diode 96. When strobe line starts to go high, capacitor 97 is charged through resistor 95 and diode 96 providing a time delay. On turn-off capacitor 97 is discharged through resistor 98 readying it for the next turn on event.

In order to be able to set up the crowbar circuit without actually firing the crowbar SCR, switch 99 is provided when switch 99 is actuated, resistor 60 is shorted and no crowbar signals can be passed to the main crowbar 73. However other parts of the circuit can be set-up and tested.

A chain reaction can be set-up using the provisions of the circuits described above. Two or more power supplies provided with the crowbar circuits of the present invention can all be crowbarred if one is crowbarred. This is accomplished by connecting the non-isolated remote control leads 76 and 77 of one power supply to the insulated input leads 81 and 82 of the chain going from to 1. Thus, if one power supply shuts down it starts a chain reaction to shut all interconnected power supplies down.

While only one form of the present invention has been shown and described, modifications are possible within the spirit and scope of the invention as set forth in particular in the appended claims.

I claim:

1. In a circuit adapted to crow-bar a power supply, the combination of;
   a silicon controlled rectifier for crow-barring a power supply;
   means for comparing the output voltage of the power supply to be crow-barred with a reference voltage and providing a crow-bar signal (in the presence of) responsive to an output voltage greater than said reference voltage by more than a predetermined (amount) voltage;

means for automatically tracking said reference voltage to maintain said predetermined voltage substantially constant in the presence of programmed changes in said output voltage;

and an opto-coupler responsive to said signal coupled to said silicon controlled rectifier for firing said silicon controlled rectifier and thereby crow-barring the power supply.

2. A crow-bar circuit as set forth in claim 1 and including;

a second silicon controlled rectifier connected between said signal providing means and said opto-coupler for energizing said coupler in response to said signal.

3. A crow-bar circuit as set forth in claim 2, and including;

a second opto-coupler in series with said second silicon controlled rectifier and the first said opto-coupler for providing an isolated crow-bar output signal.

4. A crow-bar circuit as set forth in claim 2, and including;

means for manually disabling said second silicon controlled rectifier for permitting normal operation for adjusting and testing of the circuits preceeding said second silicon controlled rectifier without firing said crow-bar.

5. A crow-bar circuit as set forth in claim 1, and including;

means for receiving an over-riding crow-bar signal from a remote source.

6. A crow-bar circuit as set forth in claim 1, and wherein said means for providing a crow-bar signal includes means for incrementing said reference voltage by a predetermined amount.

7. A crow-bar circuit as set forth in claim 1, and including;

means for crow-barring said power supply in response to a signal from another power supply crow-bar actuation.

8. A crow-bar circuit as set forth in claim 1, and including;

means for outputting a signal in response to the crow-barring of the power supply.

9. A crow-bar circuit as set forth in claim 1, and including;

isolated and non-isolated crow-bar signal input and output means.

10. A crow-bar circuit as set forth in claim 1, and including;

opto-coupler crow-bar signal input and output coupling means.

11. A crow-bar circuit as set forth in claim 1, and including;

means for delaying said crow-bar signal.

* * * * *